US012617376B2

(12) United States Patent
Prim

(10) Patent No.: US 12,617,376 B2
(45) Date of Patent: May 5, 2026

(54) PARKING BRAKE SYSTEM, COMPUTER-IMPLEMENTED METHOD OF CONTROLLING A PARKING BRAKE SYSTEM OF A RAIL VEHICLE, COMPUTER PROGRAM AND NON-VOLATILE DATA CARRIER

(71) Applicant: DELLNER BUBENZER AB, Borlänge (SE)

(72) Inventor: Viktor Prim, Sandviken (SE)

(73) Assignee: DELLNER BUBENZER AB, Borlänge (SE)

( * ) Notice: Subject to any disclaimer, the term of this patent is extended or adjusted under 35 U.S.C. 154(b) by 3 days.

(21) Appl. No.: 18/834,031

(22) PCT Filed: Nov. 24, 2022

(86) PCT No.: PCT/EP2022/083172
§ 371 (c)(1),
(2) Date: Jul. 29, 2024

(87) PCT Pub. No.: WO2023/156035
PCT Pub. Date: Aug. 24, 2023

(65) Prior Publication Data
US 2025/0100518 A1 Mar. 27, 2025

(30) Foreign Application Priority Data
Feb. 18, 2022 (EP) ..................................... 22157538

(51) Int. Cl.
*B60T 8/17* (2006.01)
*B60T 8/171* (2006.01)
(Continued)

(52) U.S. Cl.
CPC ............ *B60T 8/1705* (2013.01); *B60T 8/171* (2013.01); *B60T 8/172* (2013.01); *B60T 8/3205* (2013.01);
(Continued)

(58) Field of Classification Search
CPC ........ B60T 8/1705; B60T 8/171; B60T 8/172; B60T 8/3205; B60T 8/885; B60T 8/92;
(Continued)

(56) References Cited

U.S. PATENT DOCUMENTS

2008/0135357 A1* 6/2008 Lang ....................... B60T 13/74
320/167
2014/0060979 A1* 3/2014 Martin .................. B60T 17/228
188/1.11 E
(Continued)

FOREIGN PATENT DOCUMENTS

AT 511269 A1 10/2012
DE 102008007940 A1 8/2009
(Continued)

*Primary Examiner* — Sizo B Vilakazi
(74) *Attorney, Agent, or Firm* — Dilworth & Barrese, LLP

(57) ABSTRACT

A parking brake system for a rail vehicle (100) contains a brake actuator (120) for receiving a parking-brake command (cmd$_P$) and producing an electric brake-force signal (BF). A brake unit (200) contains first and second pressing members (211, 212) and a rotatable member (110) being mechanically linked to a wheel (105) of the rail vehicle (100). When receiving the electric brake-force signal (BF), the brake unit (200) causes the first and second pressing members (211, 212) to apply a braking force to the rotatable member (110) to keep the wheel (105) immobile. A gear assembly (220) in the brake unit (200) operates mechanically on the first and second pressing members (211; 212). In response to the electric brake-force signal (BF), an electric motor (230) acts on the gear assembly (220) to cause the first and second
(Continued)

pressing members (211; 212) to attain a specified position interrelationship. An acceleration sensor (125) registers movements of the rail vehicle (100). If movements of the rail vehicle (100) above a magnitude threshold level are registered during a period when the parking-brake command ($cmd_P$) has instructed the at least one wheel (105) to be immobile, the brake actuator (120) reproduces the electric brake-force signal (BF) to reapply the braking force to the rotatable member (110).

20 Claims, 3 Drawing Sheets

(51) Int. Cl.

| | |
|---|---|
| *B60T 8/172* | (2006.01) |
| *B60T 8/32* | (2006.01) |
| *B60T 8/88* | (2006.01) |
| *B60T 8/92* | (2006.01) |
| *B60T 13/74* | (2006.01) |
| *B60T 17/22* | (2006.01) |
| *B61C 17/06* | (2006.01) |
| *B61H 5/00* | (2006.01) |
| *B61H 13/00* | (2006.01) |
| *B61L 15/00* | (2006.01) |
| *H01M 10/46* | (2006.01) |
| *H02J 7/34* | (2006.01) |

(52) U.S. Cl.
CPC ................ *B60T 8/885* (2013.01); *B60T 8/92* (2013.01); *B60T 13/746* (2013.01); *B60T 17/228* (2013.01); *B61C 17/06* (2013.01); *B61H 5/00* (2013.01); *B61H 13/00* (2013.01); *B61L 15/0027* (2013.01); *B61L 15/0036* (2013.01); *B61L 15/0062* (2024.01); *H01M 10/46* (2013.01); *B60T 2250/00* (2013.01); *B60T 2270/402* (2013.01); *B60T 2270/414* (2013.01); *H01M 2220/20* (2013.01); *H02J 7/345* (2013.01)

(58) Field of Classification Search
CPC .. B60T 13/746; B60T 17/228; B60T 2250/00; B60T 2270/402; B60T 2270/414; B60T 13/665; B61C 17/06; B61H 5/00; B61H 13/00; B61L 15/0027; B61L 15/0036; B61L 15/0062; H01M 10/46; H01M 2220/20; H02J 7/345; F16D 55/2245
See application file for complete search history.

(56) References Cited

U.S. PATENT DOCUMENTS

| | | | |
|---|---|---|---|
| 2016/0280195 A1 | 9/2016 | Kull et al. | |
| 2020/0198605 A1* | 6/2020 | Wu | .......................... B61H 5/00 |

FOREIGN PATENT DOCUMENTS

| | | |
|---|---|---|
| EP | 2913238 A1 | 9/2015 |
| WO | 2020/069737 A1 | 4/2020 |

* cited by examiner

PARKING BRAKE SYSTEM, COMPUTER-IMPLEMENTED METHOD OF CONTROLLING A PARKING BRAKE SYSTEM OF A RAIL VEHICLE, COMPUTER PROGRAM AND NON-VOLATILE DATA CARRIER

TECHNICAL FIELD

The present invention relates generally to immobilization of rail vehicles. Especially, the invention relates to a parking brake system for a rail vehicle according to the preamble of claim 1 and a corresponding computer-implemented method. The invention also relates to a computer program and a non-volatile data carrier storing such a computer program.

BACKGROUND

In operation of an electrically powered rail vehicle, the onboard motors are typically engaged as generators to decelerate the rail vehicle. However, for efficiency and safety reasons, one cannot rely solely on this braking strategy. In particular, a dedicated brake function will always be needed to ensure emergency braking functionality and that the rail vehicle remains stationary after that it has been brought to a stop.

In many cases, the same brake units are used for different types of braking functionality, such as service braking, emergency braking and parking braking. Today's rail vehicle brakes characteristically use pneumatically regulated brakes. This is disadvantageous inter alia due to their slow and imprecise regulation, however also because the risk of leakages and resulting malfunction.

Recently, electrically controlled brakes have been presented as an alternative to pneumatically regulated brakes. For example, US 2020/0198605 describes a microcomputer-controlled electromechanical braking system containing an electromechanical braking control device and an electromechanical braking unit. The electromechanical braking control device includes a braking microcomputer control unit, an electromechanical control unit and a standby power supply module. The braking microcomputer control unit receives a braking instruction signal sent by a driver or an automatic driving system, performs the calculation of a target braking force and braking management. If the electromagnetic brake is powered off, a screw-and-nut arrangement locks the brake to maintain the braking force. When a torque motor rotor rotates reversely, the nut makes a translational motion reversely, and the braking force is released.

CN 111422174 discloses an automatic parking braking device for a passenger train, which avoids the need for so-called stop blocks to be arranged at the wheels of the vehicle when being parked for longer periods of time. The design contains two ends of a cam fixed swing rod and the ends of a cam gap adjusting swing rod of the braking device are movably connected with two braking connecting rods and a sliding seat correspondingly. The sliding seat is connected into a sliding groove of a self-locking mechanism base in a sliding mode, and a parking braking air cylinder is arranged in the sliding groove. The sliding seat is elastically connected with a gap adjusting wedge-shaped sliding block. The braking method comprises the following steps that the sliding seat slides into the sliding groove, the cam fixed swing rod and the cam gap adjusting swing rod move in the direction of the sliding groove, one ends of the two braking connecting rods get close to the sliding seat, the two braking pads get away from a braking wheel disc, automatic relieving is achieved, and otherwise braking parking is achieved. According to the invention, during braking and parking, the operation time is short, the efficiency is high, effective braking can be ensured, an anti-slip iron shoe does not need to be placed manually, the labor intensity is low, the possibility of omission when anti-slip measures are removed does not exist, and the safety is higher.

EP 2 939 891 shows an electric parking brake device for a vehicle. The electric parking brake device includes an actuator device that is designed to actuate mechanical components of a wheel brake device; and a control device which controls the actuator device electrically. The control device is set up to detect whether a battery disconnect switch has been actuated and, if the battery disconnect switch has been actuated, the control device initiates partial braking by means of the actuator device within a latency period after the battery disconnect switch has been actuated, during which the actuator device can still be controlled electrically, such that that a full braking effect of the electric parking brake is delayed.

Thus, electromechanical braking systems are known, which inter alia relate to parking brake functionality. For example, one design enables an electropneumatically controllable parking brake to be applied if a battery has been disconnected. However, there is no technical solution ensuring that a parking-braked rail vehicle actually remains immobilized until a brake-release command is generated.

SUMMARY

The object of the present invention is therefore to offer a solution that solves the above problem and provides an electric-based parking brake function of improved reliability.

According to one aspect of the invention, the object is achieved by a parking brake system for a rail vehicle, which system contains a brake actuator and a brake unit. The brake actuator is configured to receive a parking-brake command, and in response thereto produce an electric brake-force signal. The brake unit, in turn, contains first and second pressing members and a rotatable member being mechanically linked to at least one wheel of the rail vehicle. The brake unit is configured to receive the electric brake-force signal, and in response thereto cause the first and second pressing members to apply a braking force to the rotatable member so as to keep the at least one wheel immobile. A gear assembly in the brake unit is arranged to operate mechanically on the first and second pressing members, and an electric motor in the brake unit is configured to, act on the gear assembly in response to the electric brake-force signal so as to cause the first and second pressing members to move towards or away from the rotatable member and attain a specified position interrelationship. Additionally, the brake system contains an acceleration sensor configured to register movements of the rail vehicle and produce an output signal indicative of a magnitude of the movements of the rail vehicle. Moreover, the brake actuator is configured to receive the output signal; and if, during a period when the parking-brake command has instructed the at least one wheel to be immobile, the output signal indicates movements of the rail vehicle at a magnitude above a threshold level the brake actuator is configured to control the brake actuator to reproduce the electric brake-force signal to the electric motor to cause the first and second pressing members to reapply the bra-king force to the rotatable member. Thus, the at least one wheel is kept immobile.

The above parking brake system is advantageous because it automatically identifies and counteracts any unintentional movements of the rail vehicle. Hence, the parking brake functionality can be made highly reliable.

According to one embodiment of this aspect of the invention, the brake actuator is configured to generate a first alarm message if the acceleration sensor registers a movement of the rail vehicle at a magnitude above the threshold level during the period when the parking-brake command has instructed the at least one wheel to be immobile. Consequently, a monitoring entity can be promptly informed of any unintentional movements of the rail vehicle.

According to another embodiment of this aspect of the invention, the brake actuator is connected to at least one data bus in the rail vehicle the at least one data bus is configured to communicate at least one of control signals and status messages. For example, the brake actuator may be configured to send the first alarm message as one of the status messages over one of the at least one data bus. Thereby, all relevant entities in the rail vehicle may be efficiently informed about the alarm condition.

Preferably, the brake actuator contains a wireless interface configured to send a second alarm message on a wireless format. if, during the period when the parking-brake command has instructed the at least one wheel to be immobile, the acceleration sensor registers a movement of the rail vehicle at a magnitude above the threshold level. Thus, one or more external parties may conveniently be informed of the fact that the rail vehicle was unintentionally moved.

According to still another embodiment of this aspect of the invention, the brake actuator contains an alarm signal generator configured to emit an acoustic and/or visual signal; if, during the period when the parking-brake command has instructed the at least one wheel to be immobile, the acceleration sensor registers a movement of the rail vehicle at a magnitude above the threshold level. This is beneficial because the acoustic signal may serve as a pointer for a service technician towards the failing brake unit.

According to yet another embodiment of this aspect of the invention, the parking brake system contains a backup power unit configured to accumulate electric power from a power line in the rail vehicle during operation of the rail vehicle. In case of an outage of the electric power, the backup power unit is configured to provide the accumulated electric power to the brake actuator and the brake unit, thus enabling the electric motor to maintain the specified position interrelationship between the first and second pressing members resulting from the electric brake-force signal also during the power outage.

According to further embodiments of this aspect of the invention the backup power unit, in turn, contains at least one rechargeable battery and/or at least one capacitive element configured to hold the accumulate electric power.

According to another aspect of the invention, the object is achieved by a computer-implemented method of controlling a parking brake system of a rail vehicle. The parking brake system contains: a brake actuator configured to receive a parking-brake command, and in response thereto produce an electric brake-force signal. A brake unit is presumed to include first and second pressing members and a rotatable member being mechanically linked to at least one wheel of the rail vehicle. The brake unit is configured to receive the electric brake-force signal, and in response thereto cause the first and second pressing members to apply a braking force to the rotatable member so as to keep the at least one wheel immobile. The brake unit also contains a gear assembly arranged to operate mechanically on the first and second pressing members, an electric motor configured to act on the gear assembly in response to the electric brake-force signal so as to cause the first and second pressing members to move towards or away from the rotatable member and attain a specified position interrelationship. The method involves registering movements of the rail vehicle, and producing an output signal indicative of a magnitude of the movements of the rail vehicle. Specifically, if during a period when the parking-brake command has instructed the at least one wheel to be immobile, the output signal indicates movements of the rail vehicle at a magnitude above a threshold level, the method further involves controlling the brake actuator to reproduce the electric brake-force signal to the electric motor to cause the first and second pressing members to reapply the bra-king force to the rotatable member. As a result, the at least one wheel is kept immobile. The advantages of this method, as well as the preferred embodiments thereof are apparent from the discussion above with reference to the proposed parking brake system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
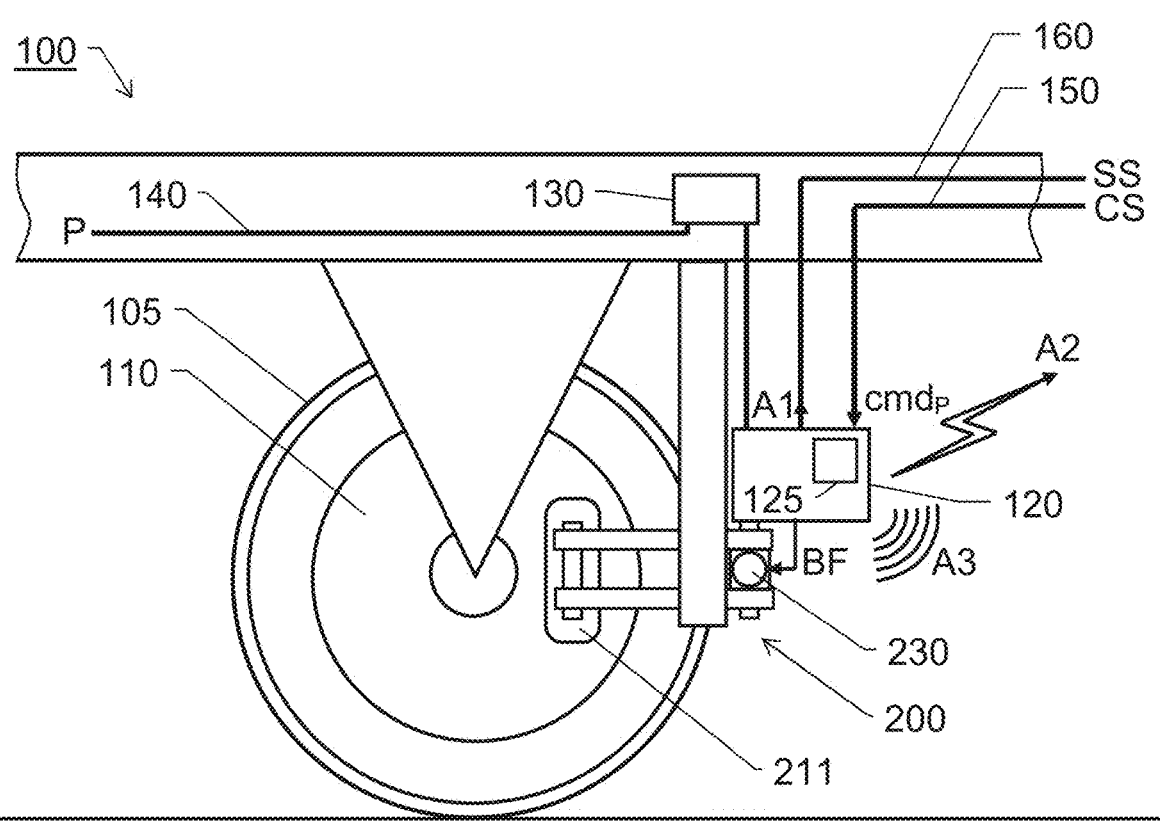
FIG. 1 schematically illustrates a rail vehicle equipped with a brake system according to one embodiment of the invention.

In FIG. 1, we see a schematic illustration of a rail vehicle 100 equipped with a parking brake system according to one embodiment of the invention. The parking brake system contains a brake actuator 120 and a brake unit 200.

The brake actuator 120 is configured to receive a parking-brake command $cmd_P$, which typically has been generated based on a driver's instruction. Naturally, however, the parking-brake command $cmd_P$ may equally well be generated automatically, for example if a particular set of criteria is fulfilled. One example of such a criterion may be if the power supply to the rail vehicle is interrupted.

According to one embodiment of the invention, the rail vehicle 100 contains at least one data bus, for example a first data bus 150 configured to communicate control signals CS.

In such a case, the parking-brake command $cmd_P$ may be received in the brake actuator 120 as one of the control signals CS via the first data bus 150.

In response to the parking-brake command $cmd_P$ the brake actuator 120 is configured to produce an electric brake-force signal BF, which is sent to the brake unit 200.

The brake unit 200 includes first and second pressing members 211 and 212 respectively and a rotatable member 110, which is mechanically linked to at least one wheel 105 of the rail vehicle 100. The brake unit 200 is configured to receive the electric brake-force signal BF, and in response thereto cause the first and second pressing members 211 and 212 to apply a braking force to the rotatable member 110, so as to keep the at least one wheel 105 immobile. According to the invention, the parking brake system contains an acceleration sensor 125, and the brake unit 200, in turn, contains a gear assembly 220 and an electric motor 230, for example represented by a stepper motor or a DC motor.

The gear assembly 220 is arranged to operate mechanically on the first and second pressing members 211 and 212.

In response to the electric brake-force signal BF, the electric motor 230 is configured to act on the gear assembly 220 so as to cause the first and second pressing members 211 and 212 to move towards or away from the rotatable member 110 and attain a specified position interrelationship. Thereby, for instance, an activating parking-brake command $cmd_P$ may result in that the parking brake is applied, and a negating parking-brake command $cmd_P$ may result in that the parking brake is released.

The acceleration sensor 125 may be included in the brake actuator 120. However, alternatively, the acceleration sensor 125 may also be arranged at a different location in the rail vehicle 100, such as on a frame/chassis part thereof. The acceleration sensor 125 is configured to register movements of the rail vehicle 100 and produce an output signal indicative of a magnitude of the movements of the rail vehicle 100.

In any case, the brake actuator 120 is configured to receive the output signal from the acceleration sensor 125. If the output signal indicates movements of the rail vehicle 100 at a magnitude above a threshold level during a period when the parking-brake command $cmd_P$ has instructed the at least one wheel 105 to be immobile, the brake actuator 120 is configured to control the brake actuator 120 to reproduce the electric brake-force signal BF to the electric motor 230 to cause the first and second pressing members 211 and 212 to reapply the braking force to the rotatable member 110, so as to keep the at least one wheel 105 immobile.

In other words, if after receiving an activating parking-brake command and prior to receiving a negating ditto, the acceleration sensor 125 registers a movement of the rail vehicle 100 at a magnitude above a threshold level, the brake actuator 120 triggers at least one precautionary measure to be taken.

Specifically, in such a case, the brake actuator 120 is configured to control the brake actuator 120 to reproduce the electric brake-force signal BF to the electric motor 230 to cause the first and second pressing members 211 and 212 to reapply the braking force to the rotatable member 110. Thereby, should the first and second pressing members 211 and 212 for some reason have been displaced from the specified position interrelationship they will be controlled back to the specified position interrelationship so as to keep the at least one wheel 105 immobile.

Additionally, according to another embodiment of the invention, the brake actuator 120 is configured to generate a first alarm message A1 if the acceleration sensor 125 registers a movement of the rail vehicle 100 at a magnitude above the threshold level during the period when the parking-brake command $cmd_P$ has instructed the at least one wheel 105 to be immobile.

For example, the rail vehicle 100 may contain a second data bus 160, which is configured to communicate status messages SS and to which second data bus 160 the brake actuator 120 is connected. In such a case, the brake actuator 120 may be configured to send the first alarm message A1 as one of the status messages SS over the second data bus 160.

Figure 3:
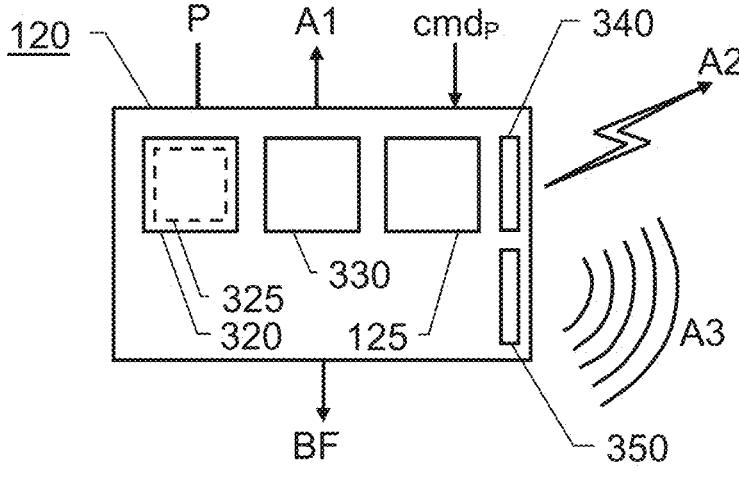
FIG. 3 shows a block diagram of a brake actuator according to one embodiment of the invention.

Referring now briefly to FIG. 3. According to another embodiment of the invention, the brake actuator 120 contains a wireless interface 340 configured to send a second alarm message A2 on a wireless format, such as an SMS (short message service) message in a wireless telecommunication system. Thereby, one or more relevant external parties may be informed of the temporary parking brake malfunction, so that adequate measures can be taken.

Alternatively or additionally, the brake actuator 120 may contain an alarm signal generator 350 configured to emit an acoustic signal and/or a visual signal A3. Analogously to the above, the brake actuator 120 is configured to cause the alarm signal generator 350 to emit said signal(s) A3, e.g. an alarm sound and/or a flashing or steady light, if the acceleration sensor 125 registers a movement of the rail vehicle 100 at a magnitude above the threshold level during the period when the parking-brake command $cmd_P$ has instructed the at least one wheel 105 to be immobile. Consequently, the acoustic signal A3 may efficiently lead a service technician towards the malfunctioning brake.

Figure 2:
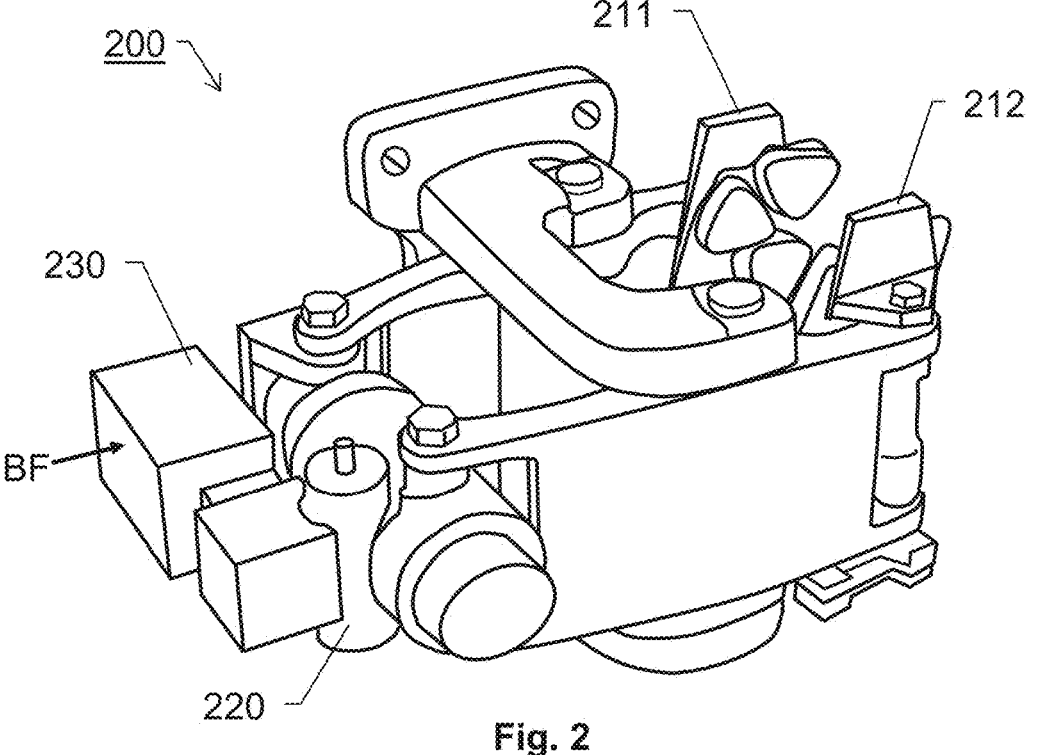
FIG. 2 shows a brake unit according to one embodiment of the invention.

FIG. 2 shows a brake unit 200 according to one embodiment of the invention. The brake unit 200 includes first and second pressing members 211 and 212 respectively and a rotatable member 110 that is mechanically linked to at least one wheel 105 of the rail vehicle 100. The brake unit 200 is configured to receive the electric brake-force signal BF. In response to the electric brake-force signal BF, the brake unit 200 is configured to perform a parking brake operation. As mentioned above, the parking brake command $cmd_P$ typically either means activating the parking brake, i.e. applying the parking brake or deactivating parking brake, i.e. releasing the parking brake. In an active parking-brake situation, the brake command $cmd_P$ is configured to cause the at least one wheel 105 to remain immobile. When the rail vehicle shall resume its movement, a negating parking-brake command $cmd_P$ is produced which is configured cause the first and second pressing members 211 and 212 to release an already applied braking force to the rotatable member 110 so as to enable the rotatable member 110 and the at least one wheel 105 to rotate again.

The gear assembly 220 is arranged to operate mechanically on the first and second pressing members 211 and 212 respectively. Functionally, the gear assembly 220 is located between the electric motor 230 and the pressing members 211 and 212.

In response to the electric brake-force signal BF, the electric motor 230 is configured to act on the gear assembly 220 so as to cause the first and second pressing members 211 and 212 to move towards or away from the rotatable member 110 and attain a specified position interrelationship. Here, a first specified position interrelationship may correspond to a released state for the parking brake, i.e. wherein the rotatable member 110 and the at least one wheel 105 are enabled to rotate; and a second specified position interrelationship may correspond to a parking-braked state, wherein the first and second pressing members 211 and 212 apply a braking force to the rotatable member 110 so as to keep the at least one wheel 105 immobile.

It is advantageous to implement the electric motor 230 as a stepper motor because the stepper motor provides highly accurate positioning of its power transmission shaft without requiring a position sensor for feedback. The stepper motor is typically a brushless DC electric motor that divides a full rotation into a number of equal steps, say 100, which may be provided by a gear-shaped iron rotor with 25 teeth giving 3.6 degrees of rotation per step. The stepper motor 230 can be commanded to move and hold a position at one of these steps by open loop control provided that the motor is adapted to the application in respect to torque and speed.

Alternatively, the electric motor 230 may instead be Implemented by means of a DC motor. This is beneficial because it is straightforward to control an output torque of the DC motor's power transmission shaft via a control current.

According to one embodiment of the invention, the parking brake system includes a backup power unit 130, which is configured to accumulate electric power W from a power line 140 in the rail vehicle 100 during normal operation of the rail vehicle 100. As will be discussed below with reference to FIGS. 4 and 5, electric power may be stored in at least one battery and/or at least one capacitive element.

In case of an outage of the electric power W, for example due to that an onboard current collector on the rail vehicle 100 has lost physical contact with an external overhead line or due to a cable breakage in the rail vehicle 100, the backup power unit 130 is configured to automatically provide accumulated electric power stored in the backup power unit 130 to the brake actuator 120 and the brake unit 200. Thereby, the electric motor 130 is enabled to maintain the specified position interrelationship between the first and second pressing members 211 and 212 as given by the electric brake-force signal BF also during the outage of the electric power W.

Figure 4:
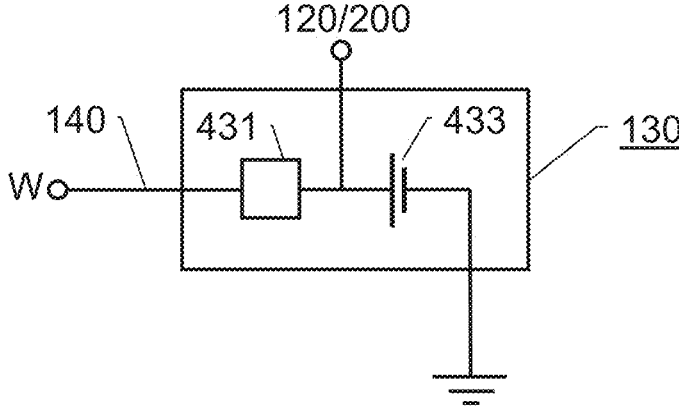
FIG. 4 shows a backup power unit according to a first embodiment of the invention.

In the embodiment shown in FIG. 4, the backup power unit 130 is connected between the power line 140 and the brake actuator 120/brake unit 200. The backup power unit 130 contains a battery charger 431 and a rechargeable battery 433.

During normal operation of the rail vehicle 100, electric power W received from the power line 140 passes through the backup power unit 130. At the same time, the battery charger 431 receives the incoming electric power W and charges the battery 433. In case of electric power outage on the power line 140, accumulated electric power from the battery 433 will instead be fed out to the brake actuator 120 and the brake unit 200. Thus, regardless of whether there is electric power W on the power line 140, there will always be electric power available to the brake actuator 120 and the brake unit 200.

Figure 5:
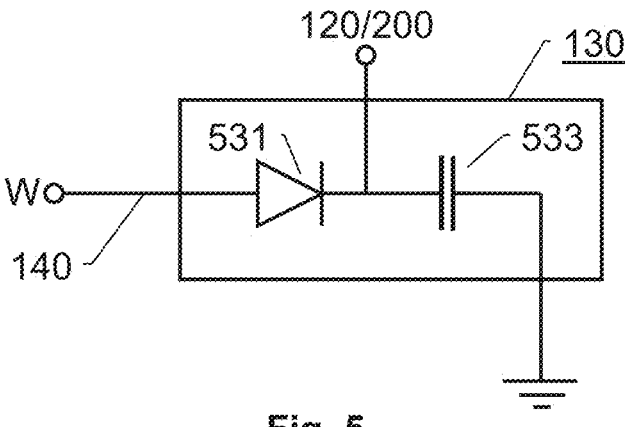
FIG. 5 shows a backup power unit according to a second embodiment of the invention.

FIG. 5 shows the backup power unit 130 according to a second embodiment of the invention. Here, the backup power unit 130 contains a rectifier 531 and at least one capacitive element 533. Analogous to the above, in the embodiment shown in FIG. 5, the backup power unit 130 is connected between the power line 140 and the brake actuator 120/brake unit 200.

During normal operation of the rail vehicle 100, electric power W received from the power line 140 passes through the backup power unit 130. At the same time, the rectifier 531 forwards incoming electric power W to the at least one capacitive element 533. In case of electric power outage on the power line 140, electric power accumulated in the at least one capacitive element 533 will instead be fed out to the brake actuator 120 and the brake unit 200. Thus, regardless of whether there is electric power W on the power line

140, there will always be electric power available to the brake actuator 120 and the brake unit 200.

It is generally advantageous if the above-described braking procedure is effected in an automatic manner by executing one or more computer programs. Therefore, the brake actuator 120 preferably includes processing circuitry and programmed memory units, the design of which will be briefly described below with reference to FIG. 3.

FIG. 3 shows a block diagram of the brake actuator 120 according to one embodiment of the invention. The brake actuator 120 includes processing circuitry in the form of at least one processor 330 and a memory unit 320, i.e. non-volatile data carrier, storing a computer program 325, which, in turn, contains software for making the at least one processor 330 execute the actions mentioned in this disclosure when the computer program 325 is run on the at least one processor 330. As mentioned above, the brake actuator 120 may also contain a wireless interface 340 configured to send the second alarm message A2 on a wireless format and/or an alarm signal generator 350 configured to emit acoustic and/or visual signals A3.

Figure 6:
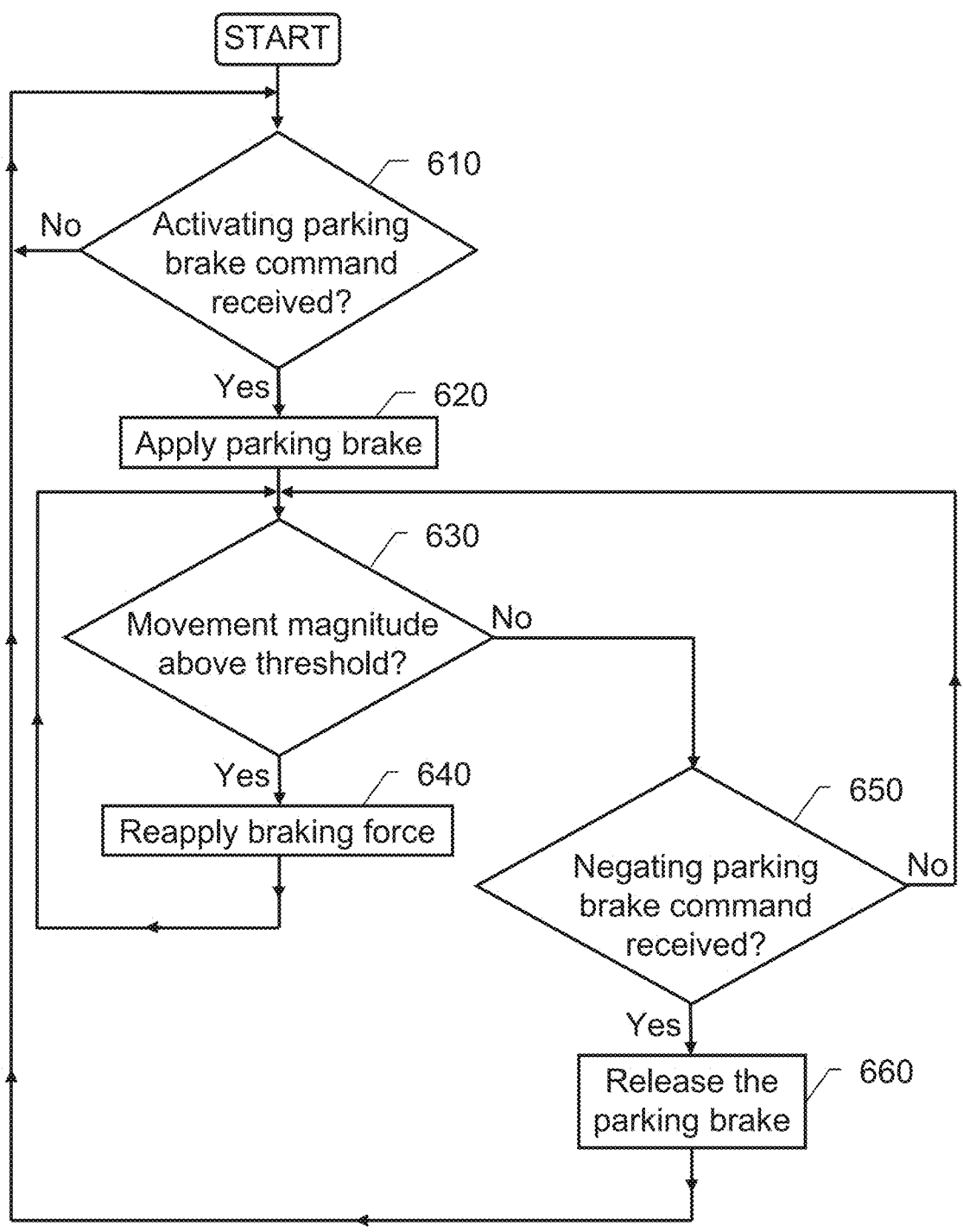
FIG. 6 illustrates, by means of a flow diagram, the method according to the invention.

In order to sum up, and with reference to the flow diagram in FIG. 6, we will now describe the computer-implemented method according to the invention of controlling a parking brake system of a rail vehicle, which parking brake system is presumed to contain a brake actuator 120 configured to receive a parking-brake command $cmd_P$, and in response thereto produce an electric brake-force signal BF. The parking brake system is further presumed to contain a brake unit 200 including first and second pressing members 211 and 212 respectively and a rotatable member 110 that is mechanically linked to at least one wheel 105 of the rail vehicle 100. The brake unit 200 is configured to receive the electric brake-force signal BF, and in response thereto cause the first and second pressing members 211 and 212 to apply a braking force to the rotatable member 110 so as to keep the at least one wheel 105 immobile.

In a first step 610, it is checked whether an activating parking brake command has been received; and if so, a step 620 follows. Otherwise, the procedure loops back and stays in step 610.

In step 620, the brake actuator 120 controls the brake actuator 120 to produce such an electric brake-force signal BF that the electric motor 230 causes the first and second pressing members 211 and 212 to apply a parking brake force to the rotatable member 110 and thus prevent the at least one wheel 105 from rotating.

In step 630, it is checked if the acceleration sensor 125 has registered a movement of the rail vehicle 100 at a magnitude above a threshold level; and if so, a step 640 follows. Otherwise, a step 650 follows.

In step 640, the brake actuator 120 controls the brake actuator 120 to reproduce the electric brake-force signal BF to the electric motor 230 to cause the first and second pressing members 211 and 212 to reapply the braking force to the rotatable member 110 as described above in order to keep the at least one wheel 105 immobile. Thereafter, the procedure loops back to step 630.

Preferably, according to embodiments of the invention, in connection with reapplying the braking force to the rotatable member 110, one or more alarm messages are produced to notify relevant entities/parties.

In step 650, it is checked whether a negating parking brake command has been received; and if so, a step 660 follows. Otherwise, the procedure loops back to step 630.

In step 660, the brake actuator 120 controls the brake actuator 120 to produce such an electric brake-force signal BF that the electric motor 230 causes the first and second pressing members 211 and 212 to release the rotatable member 110 and thus allow the at least one wheel 105 to rotate freely. Thereafter, the procedure loops back to step 610.

Variations to the disclosed embodiments can be understood and effected by those skilled in the art in practicing the claimed invention, from a study of the drawings, the disclosure, and the appended claims.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

The invention is not restricted to the described embodiments in the figures, but may be varied freely within the scope of the claims.

The invention claimed is:

1. A parking brake system for a rail vehicle (100), which parking brake system comprises:

a brake actuator (120) configured to receive a parking-brake command (cmdP), and in response thereto produce an electric brake-force signal (BF), and a brake unit (200) comprising first and second pressing members (211, 212), a rotatable member (110) being mechanically linked to at least one wheel (105) of the rail vehicle (100), the brake unit (200) being configured to receive the electric brake-force signal (BF), and in response thereto cause the first and second pressing members (211, 212) to apply a braking force to the rotatable member (110) to keep the at least one wheel (105) immobile, a gear assembly (220) arranged to operate mechanically on the first and second pressing members (211; 212), and an electric motor (230) configured to, in response to the electric brake-force signal (BF), act on the gear assembly (220) to cause the first and second pressing members (211; 212) to move towards or away from the rotatable member (110) and attain a specified position interrelationship, wherein the brake system further comprises an acceleration sensor (125) configured to register movements of the rail vehicle (100) and produce an output signal indicative of a magnitude of the movements of the rail vehicle (100), and the brake actuator (120) is configured to receive the output signal; and if, during a period when the parking-brake command (cmdP) has instructed the at least one wheel (105) to be immobile, the output signal indicates movements of the rail vehicle (100) at a magnitude above a threshold level, and control the brake actuator (120) to reproduce the electric brake-force signal (BF) to the electric motor (230) to cause the first and second pressing members (211, 212) to reapply the braking force to the rotatable member (110) to keep the at least one wheel (105) immobile.

2. The parking brake system according to claim 1, wherein the brake actuator (120) is further configured to generate a first alarm message (A1) if, during the period when the parking-brake command (cmd$_P$) has instructed the at least one wheel (105) to be immobile, the acceleration sensor (125) registers a movement of the rail vehicle (100) at a magnitude above the threshold level.

3. The parking brake system according to claim 2, wherein the brake actuator (120) is connected to at least one data bus (150, 160) in the rail vehicle (100), which at least one data bus (150, 160) is configured to communicate at least one of control signals (CS) and status messages (SS).

4. The parking brake system according to claim 3, wherein the brake actuator (120) is configured to send the first alarm message (A1) as one of the status messages (SS) over one of the at least one data bus (160).

5. The parking brake system according to claim 1, wherein the brake actuator (120) further comprises a wireless interface (340) configured to send a second alarm message (A2) on a wireless format if, during the period when the parking-brake command (cmd$_P$) has instructed the at least one wheel (105) to be immobile, the acceleration sensor (125) registers a movement of the rail vehicle (100) at a magnitude above the threshold level.

6. The parking brake system according to claim 1, wherein the brake actuator (120) further comprises an alarm signal generator (350) configured to emit at least one of an acoustic signal and a visual signal (A3) if, during the period when the parking-brake command (cmd$_P$) has instructed the at least one wheel (105) to be immobile, the acceleration sensor (125) registers a movement of the rail vehicle (100) at a magnitude above the threshold level.

7. The parking brake system according to claim 1, further comprising a backup power unit (130) configured to accumulate electric power (W) from a power line (140) in the rail vehicle (100) during operation of the rail vehicle (100), and in case of an outage of the electric power (W) provide the accumulated electric power to the brake actuator (120) and the brake unit (200) thus enabling the electric motor (130) to maintain the specified position interrelationship between the first and second pressing members (211; 212) resulting from the electric brake-force signal (BF) also during said outage.

8. The parking brake system according to claim 7, wherein the backup power unit (130) comprises at least one rechargeable battery (433), and a battery charger (431) connected to the power line (140) and configured to transfer electric power (W) received from the power line (140) to the at least one rechargeable battery (433), wherein the at least one rechargeable battery (433) is arranged to feed electric power to the brake actuator (120) and the brake unit (200) if the electric power (W) on the power line (140) fails.

9. The parking brake system according to claim 7, wherein the backup power unit (130) comprises:

at least one capacitive element (533), and a rectifier (531) connected to the power line (140) and configured to transfer electric power (W) received from the power line (140) to the at least one capacitive element (533), wherein the at least one capacitive element (533) is arranged to feed electric power to the brake actuator (120) and the brake unit (200) if the electric power (W) on the power line (140) fails.

10. A computer-implemented method of controlling a parking brake system of a rail vehicle (100), which parking brake system comprises: a brake actuator (120) configured to receive a parking-brake command ($cmd_P$), and in response thereto produce an electric brake-force signal (BF), and a brake unit (200) comprising first and second pressing members (211, 212) and a rotatable member (110) being mechanically linked to at least one wheel (105) of the rail vehicle (100), which brake unit (200) is configured to receive the electric brake-force signal (BF), and in response thereto cause the first and second pressing members (211, 212) to apply a braking force to the rotatable member (110) to keep the at least one wheel (105) immobile, the brake unit (200) further comprising a gear assembly (220) arranged to operate mechanically on the first and second pressing members (211; 212), and an electric motor (230) configured to, in response to the electric brake-force signal (BF), act on the gear assembly (220) to cause the first and second pressing members (211; 212) to move towards or away from the rotatable member (110) and attain a specified position interrelationship, said method comprising the steps of registering movements of the rail vehicle (100), producing an output signal indicative of a magnitude of the movements of the rail vehicle (100), receiving the output signal, and if, during a period when the parking-brake command ($cmd_P$) has instructed the at least one wheel (105) to be immobile, the output signal indicates movements of the rail vehicle (100) at a magnitude above a threshold level, and controlling the brake actuator (120) to reproduce the electric brake-force signal (BF) to the electric motor (230) to cause the first and second pressing members (211, 212) to reapply the braking force to the rotatable member (110) to keep the at least one wheel (105) immobile.

11. The method according to claim 10, further comprising generating a first alarm message (A1) if, during the period when the parking-brake command ($cmd_P$) has instructed the at least one wheel (105) to be immobile, the acceleration sensor (125) registers a movement of the rail vehicle (100) at a magnitude above the threshold level.

12. The method according to claim 10, further comprising generating a second alarm message (A2) on a wireless format if, during the period when the parking-brake command ($cmd_P$) has instructed the at least one wheel (105) to be immobile, the acceleration sensor (125) registers a movement of the rail vehicle (100) at a magnitude above the threshold level.

13. The method according to claim 10, further comprising emitting at least one of an acoustic signal and a visual signal (A3) if, during the period when the parking-brake command ($cmd_P$) has instructed the at least one wheel (105) to be immobile, the acceleration sensor (125) registers a movement of the rail vehicle (100) at a magnitude above the threshold level.

14. The method according to claim 10, further comprising accumulating electric power (W) from a power line (140) in a backup power unit (130) in the rail vehicle (100) during operation of the rail vehicle (100), and in case of an outage of the electric power (W), and providing the accumulated electric power to the brake actuator (120) and the brake unit (200) thus enabling the electric motor (130) to maintain the specified position interrelationship between the first and second pressing members (211; 212) resulting from the electric brake-force signal (BF) also during said outage.

15. A computer program (325) loadable into a non-volatile data carrier (320) communicatively connected to at least one processor (330), the computer program (325) comprising software for executing the method according to claim 10 when the computer program (325) is run on the at least one processor (330).

16. A non-volatile data carrier (320) containing the computer program (325) of claim 15.

17. The parking brake system according to claim 4, wherein the brake actuator (120) further comprises a wireless interface (340) configured to send a second alarm message (A2) on a wireless format if, during the period when the parking-brake command ($cmd_P$) has instructed the at least one wheel (105) to be immobile, the acceleration sensor (125) registers a movement of the rail vehicle (100) at a magnitude above the threshold level.

18. The parking brake system according to claim 3, wherein the brake actuator (120) further comprises a wireless interface (340) configured to send a second alarm message (A2) on a wireless format if, during the period when the parking-brake command ($cmd_P$) has instructed the at least one wheel (105) to be immobile, the acceleration sensor (125) registers a movement of the rail vehicle (100) at a magnitude above the threshold level.

19. The parking brake system according to claim 2, wherein the brake actuator (120) further comprises a wireless interface (340) configured to send a second alarm message (A2) on a wireless format if, during the period when the parking-brake command ($cmd_P$) has instructed the at least one wheel (105) to be immobile, the acceleration sensor (125) registers a movement of the rail vehicle (100) at a magnitude above the threshold level.

20. The parking brake system according to claim 17, wherein the brake actuator (120) further comprises an alarm signal generator (350) configured to emit at least one of an acoustic signal and a visual signal (A3) if, during the period when the parking-brake command (cmd$_P$) has instructed the at least one wheel (105) to be immobile, the acceleration sensor (125) registers a movement of the rail vehicle (100) at a magnitude above the threshold level.

* * * * *